UNITED STATES PATENT OFFICE.

HUGO GELDERMANN, OF GROSS-LICHTERFELDE-OST, GERMANY, ASSIGNOR TO ACTIEN GESELLSCHAFT FÜR ANILIN FABRIKATION, OF BERLIN, GERMANY.

YELLOW PYRAZOLONE DYE FOR WOOL.

982,050. Specification of Letters Patent. Patented Jan. 17, 1911.

No Drawing. Application filed September 26, 1910. Serial No. 583,870.

*To all whom it may concern:*

Be it known that I, HUGO GELDERMANN, a subject of the King of Prussia, residing at Gross-Lichterfelde-Ost, Germany, (my post-office address being Grabenstrasse 12, Gross-Lichterfelde-Ost, Germany,) have invented certain new and useful Improvements in Yellow Dyes for Wool, of which the following is a specification.

My present invention relates to a new and very valuable dyestuff which dyes wool without a mordant from an acid bath clear and intense yellow tints of a very good fastness. This coloring matter contains a pyrazolone nucleus and possesses the following constitution:

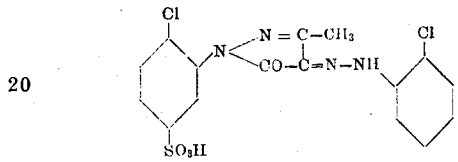

The new dyestuff may be produced by diazotizing ortho-chloroanilin and combining the diazo compound thus obtained with ortho-chloro-1-phenyl-3-methyl-5-pyrazolone-meta-sulfonic acid.

The following example serves to illustrate my invention, the parts being by weight. 12.5 parts of ortho-chloroanilin are diazotized in the usual manner by means of hydrochloric acid and sodium nitrite; the diazo compound thus obtained is combined with 31.5 parts of the sodium salt of the above cited ortho-chloro-1-phenyl-3-methyl-5-pyrazolone-meta-sulfonic acid in the presence of such a quantity of sodium carbonate as will guarantee an alkaline reaction throughout the combination process. The reaction being finished, the dyestuff is isolated in the usual manner by means of common salt; it produces on wool from an acid bath clear and intense yellow tints. The new dyestuff thus produced forms after drying and pulverizing a yellow powder which dissolves in water and in alcohol to a yellow solution. This aqueous solution on addition of concentrated hydrochloric acid separates the free acid of the dyestuff in the shape of light yellow flakes, whereas by the addition of concentrated liquor ammoniæ or concentrated soda-lye the coloration of the solution is only very little changed, the solution assuming a more reddish tint. The neutral aqueous solution when boiled with zinc dust is decolorized, but by the oxidizing action of the air assumes afterward a violet color. The new coloring matter dissolves in concentrated sulfuric acid to a yellow solution which on the addition of ice separates light yellow flakes.

My present invention is not limited to the foregoing example or to the details given therein. I wish particularly to state that instead of using a component containing the pyrazolone nucleus already formed in manufacturing the dye one can form this nucleus in the second or third step of the production of the dyestuff; thus I may combine the diazo compound of ortho-chloroanilin with acetacetic ether and condense the product thus obtained with ortho-chlorophenylhydrazin-meta-sulfonic acid to the corresponding pyrazolone derivative. Or I may condense ortho-chloro-phenylhydrazin-meta-sulfonic acid with acetacetic ether to the corresponding hydrazone, then combine this hydrazone with the diazo compound of ortho-chloroanilin to form the corresponding dye compound and finally form the pyrazolone nucleus by the action of a suitable condensing agent.

Having now described the invention and the manner in which it may be performed what I claim is,—

As a new article of manufacture the new yellow dye for wool having the formula:

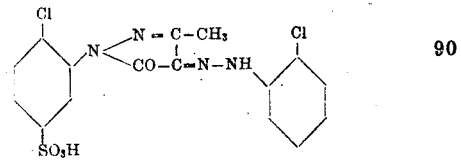

this new dyestuff in the shape of the dry sodium salt when pulverized forming a yellow powder, which dissolves in water and in alcohol to a yellow solution, and this aqueous solution on the addition of concentrated hydrochloric acid separating the free acid of the dyestuff in the shape of light yellow flakes, whereas by the addition of concentrated liquor ammoniæ or concentrated soda lye the coloration becomes only very little more reddish and the neutral aqueous solution when boiled with zinc dust being decolorized, but by the oxidizing action of the air assuming afterward a violet color, which new coloring matter dissolves in concentrated sulfuric acid to a yellow solution which on the addition of ice separates light yellow flakes, and this new dyestuff producing on wool from an acid bath clear and intense yellow tints of a very good fastness.

In testimony whereof I have hereunto set my hand in presence of two subscribing witnesses.

HUGO GELDERMANN.

Witnesses:
 HENRY HASPER,
 WOLDEMAR HAUPT.